(12) United States Patent
Speidel et al.

(10) Patent No.: US 11,603,814 B2
(45) Date of Patent: Mar. 14, 2023

(54) FILTER MODULE AND FILTER ASSEMBLY

(71) Applicant: MANN+HUMMEL GmbH, Ludwigsburg (DE)

(72) Inventors: Gerrit-Tobias Speidel, Freiberg (DE); Dietmar Talmon-Gros, Oberstenfeld (DE); Jonas Eble, Erlenbach (DE); Lars Spelter, Ditzingen (DE); Christoph Baumann, Moeglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 146 days.

(21) Appl. No.: 17/122,354

(22) Filed: Dec. 15, 2020

(65) Prior Publication Data
US 2021/0180550 A1    Jun. 17, 2021

(30) Foreign Application Priority Data
Dec. 16, 2019    (DE) .................... 10 2019 134 545.6

(51) Int. Cl.
*B01D 29/58*    (2006.01)
*F02M 37/32*    (2019.01)
*F02M 37/24*    (2019.01)

(52) U.S. Cl.
CPC ............ *F02M 37/32* (2019.01); *F02M 37/24* (2019.01); *B01D 29/58* (2013.01)

(58) Field of Classification Search
CPC ........ F02M 37/32; F02M 37/24; F02M 37/34; F02M 37/28; F02M 37/54; B01D 29/58; B01D 29/54; B01D 36/001; B01D 36/005; B01D 2201/295; B01D 2201/4038; B01D 2201/4084; B01D 46/521; B01D 46/62; F01M 11/03
See application file for complete search history.

(56) References Cited

U.S. PATENT DOCUMENTS

| | | |
|---|---|---|
| 2013/0327699 A1 | 12/2013 | Gaenswein et al. |
| 2016/0265496 A1* | 9/2016 | Baumann ............. B01D 36/001 |
| 2018/0008912 A1 | 1/2018 | Spelter et al. |

* cited by examiner

*Primary Examiner* — Waqaas Ali

(57) ABSTRACT

A filter module for a filter assembly has a primary filter element and a secondary filter element. A water separation interface is provided for discharging water, which has been separated by the primary filter element from a fluid to be filtered, from the primary filter element. A primary filter interface is provided for discharging fluid, which has been filtered by the primary filter element, from the primary filter element. A secondary filter interface is provided for discharging the fluid, which has been filtered by the secondary filter element, from the secondary filter element. The water separation interface, the primary filter interface, and the secondary filter interface are arranged coaxially to a symmetry axis of the filter module. The water separation interface, the primary filter interface, and the secondary filter interface are each designed for outflow of material flows in axial direction of the symmetry axis.

15 Claims, 6 Drawing Sheets

FILTER MODULE AND FILTER ASSEMBLY

BACKGROUND OF THE INVENTION

The present invention concerns a filter module for a filter assembly and a filter assembly with such a filter module.

A motor vehicle, for example, a truck, can comprise an internal combustion engine, for example, a diesel engine. Prior to supplying the internal combustion engine with fuel, the latter is to be filtered by means of a fuel filter. For this purpose, fuel filter modules with a pre-filter element and a main filter element, arranged in flow communication downstream of the prefilter element, can be used.

DE 10 2015 003 165 A1 discloses a fuel filter with a filter housing and with a filter insert that is exchangeably arranged in the filter housing and comprises a prefilter element and a main filter element which are arranged in the filter housing one behind the other in a direction of a longitudinal axis of the filter housing.

SUMMARY OF THE INVENTION

It is therefore object of the invention to provide an improved filter assembly.

Accordingly, a filter module, in particular a fuel filter module, for a filter assembly is proposed. The filter module comprises a primary filter element; a secondary filter element; a water separation interface for discharging water, which has been separated from a fluid to be filtered by means of the primary filter element, from the primary filter element; a primary filter interface for discharging fluid, which has been filtered by means of the primary filter element, from the primary filter element; and a secondary filter interface for discharging fluid, which has been filtered by means of the secondary filter element, from the secondary filter element; wherein the water separation interface, the primary filter interface, and the secondary filter interface are arranged coaxially to a symmetry axis of the filter module. According to the invention, the water separation interface, the primary filter interface, and the secondary filter interface are each embodied for outflow of material flows in axial direction, in particular downwardly in the direction of gravity in an arrangement of use.

The terms "primary filter element", "primary filter interface" and "secondary filter element" and "secondary filter interface" used according to the invention leave undefined a given flow regime, i.e., provide for the possibility that the primary filter element is a prefilter element as well as the possibility that the primary filter element is a main filter element and the secondary filter element correspondingly is either the prefilter element or the main filter element.

The filter module or the filter assembly is designed in particular to filter fluids, for example, air or other gases, liquids, in particular liquid operating media of a vehicle, in particular of a motor vehicle, such as oil, water, gasoline, diesel fuel, kerosene or urea solution. The filter module or the filter assembly is in particular embodied to separate contaminants, in particular particles and suspended matter, from the fuel. The filter module or the filter assembly can be used in motor vehicles, watercraft, rail vehicles, agricultural vehicles, construction machines, aircraft or the like. Moreover, the filter module or the filter assembly can be used also in immobile applications, for example, in stationary facilities for energy generation. In particular, the filter module or the filter assembly can be used in so-called heavy-duty applications.

The filter module is preferably constructed with rotational symmetry in relation to the symmetry axis. An axial direction or longitudinal direction of the filter module coincides in this context with the symmetry axis or is arranged parallel thereto. The interfaces can be designed, for example, as sealing surfaces. That the interfaces are "coaxially" arranged relative to each other can mean in particular that the interfaces each are constructed with rotational symmetry in relation to the symmetry axis and are positioned inside each other. "Coaxial" in relation to the symmetry axis means also that the interfaces extend along the symmetry axis but not in a radial direction of the filter module. The radial direction is oriented perpendicularly to the symmetry axis and points away from the latter. The interfaces can be constructed tubular or hollow cylindrical.

A filter housing of the filter assembly comprises interfaces corresponding with the interfaces of the filter module. These interfaces can be designed as sealing surfaces or the like. A separation of the filter module from the interfaces of the filter housing can be realized by an axial displacement of the filter module relative to the interfaces.

Since the interfaces are arranged coaxially, a particularly simple construction of the interfaces can be provided advantageously. Radial interfaces can thus be dispensed with. A copy protection as well as a protection against faulty installation (poka-yoke) of the filter module in the filter housing can be achieved.

In embodiments, the secondary filter interface is arranged, in relation to a radial direction of the filter module, inside the primary filter interface, wherein the primary filter interface in relation to the radial direction is arranged inside the water separation interface. That the secondary filter interface is arranged inside the primary filter interface means in particular that the primary filter interface extends circumferentially around the secondary filter interface. Correspondingly, that the primary filter interface is arranged inside the water separation interface means that the water separation interface extends circumferentially around the primary filter interface.

In embodiments, the water separation interface, the primary filter interface, and the secondary filter interface are correlated with the region of a same longitudinal end of the filter module, in particular a common end disk of the filter module. Preferably, each filter element comprises two end disks between which a filter medium is arranged. Preferably, the interfaces are correlated with a first end disk of the primary filter element which is facing away from the secondary filter element. Particularly preferred, the water separation interface, the primary filter interface, and the secondary filter interface are positioned concentrically to each other. Concentric means in this context that they are coaxial and, in addition, are located at least partially in a common plane.

In embodiments, the water separation interface, the primary filter interface, and the secondary filter interface, viewed along the symmetry axis, are positioned axially displaced relative to each other. For example, the primary filter interface is recessed axially behind the water separation interface. The secondary filter interface can be recessed axially behind the primary filter interface.

In embodiments, the filter module comprises moreover a venting interface that is arranged coaxially to the symmetry axis. The venting interface is in particular a venting pipe.

In embodiments, the venting interface is arranged inside the secondary filter interface. In particular, the venting interface is arranged, viewed along the radial direction, inside the secondary filter interface and optionally can be positioned axially recessed or can be concentrically arranged together with the water separation interface, the primary filter interface, and the secondary filter interface.

According to a particularly preferred embodiment, the primary filter element can be a prefilter element and the primary filter interface a prefilter interface, and the secondary filter element can be a main filter element and the secondary filter interface a main filter interface.

In embodiments, the prefilter element is arranged below the main filter element in relation to a direction of gravity. Alternatively, the prefilter element, in relation to the direction of gravity, can also be arranged above the main filter element.

In embodiments, the secondary filter interface extends at least in sections thereof through the primary filter element. Preferably, the secondary filter interface is provided at a standpipe of the secondary filter element. The standpipe can be designed as one piece, in particular monolithically, together with an end disk of the secondary filter element.

In embodiments, the filter module comprises moreover a water separation unit which is correlated with the primary filter element. The water separation unit comprises in particular a coalescing medium for separation of water from the fluid. The water separation unit is in particular arranged in fluid communication downstream of a filter medium of the primary filter element.

In embodiments, the secondary filter element is arranged downstream of the primary filter element. This means that the fluid to be filtered first flows through the primary filter element and subsequently through the secondary filter element.

In embodiments, the primary filter element and the secondary filter element are connected to each other with form fit, or the primary filter element and the secondary filter element are welded or fused to each other. A form-fit connection is produced by mutual engagement or engagement from behind of two components. Form-fit connections are detachable. For example, the primary filter element and the secondary filter element are connected to each other by a snap-on connection or a clip connection.

In embodiments, the filter module comprises moreover a standpipe that extends at least in sections through the primary filter element and is in fluid communication with the secondary filter interface. In particular, the standpipe is inserted into the secondary filter interface and is fluid-tightly sealed relative to it by means of a sealing element, in particular an O-ring. Alternatively, the standpipe, as mentioned before, can be embodied as one piece, in particular monolithically, with one of the end disks of the secondary filter element.

In embodiments, the primary filter element and/or the secondary filter element comprises a filter medium that is in particular folded in a star shape. The filter medium can be a filter body of flat filter material that is folded in a zigzag shape. The zigzag-shaped filter material of the filter medium can thus be designed as a star-shaped endless folded bellows that forms substantially a cylindrical envelope surface. The filter medium can be or can comprise, for example, a woven filter material, a laid filter material or a filter nonwoven. The filter medium can be designed as a single layer or as a multilayer configuration wherein one or a plurality of layers comprise fibers of cellulose, synthetic fibers, in particular PET fibers, and/or glass and/or mixtures thereof.

In embodiments, the primary filter element and/or the secondary filter element are of a hollow cylindrical shape. Preferably, the primary filter element as well as the secondary filter element are constructed of a hollow cylindrical shape and in particular with rotational symmetry in relation to the symmetry axis.

Moreover, a filter assembly, in particular a fuel filter assembly, with such a filter module and a filter housing in which the filter module is exchangeably received is proposed.

The filter housing comprises preferably a filter pot in which the filter module is received as well as a housing cover that can be screwed onto the filter pot. The filter module can be coupled with the housing cover such that upon removal of the housing cover the filter module is pulled out of the housing pot.

BRIEF DESCRIPTION OF THE DRAWINGS

In the Figures, same or functionally the same elements, inasmuch as nothing to the contrary is indicated, are provided with the same reference characters.

DESCRIPTION OF PREFERRED EMBODIMENTS

The description of the Figures discloses an embodiment in which the primary filter element 3 is a prefilter element 3 and in which the secondary filter element 4 is a main filter element 4, i.e., shows an arrangement in which the primary filter element 3 and the secondary filter element 4 are flowed through serially. The herein mentioned features and advantages are however also applicable to embodiments according to which the primary filter element 3 is a main filter element and the secondary filter element 4 is a prefilter element.

Figure 1:
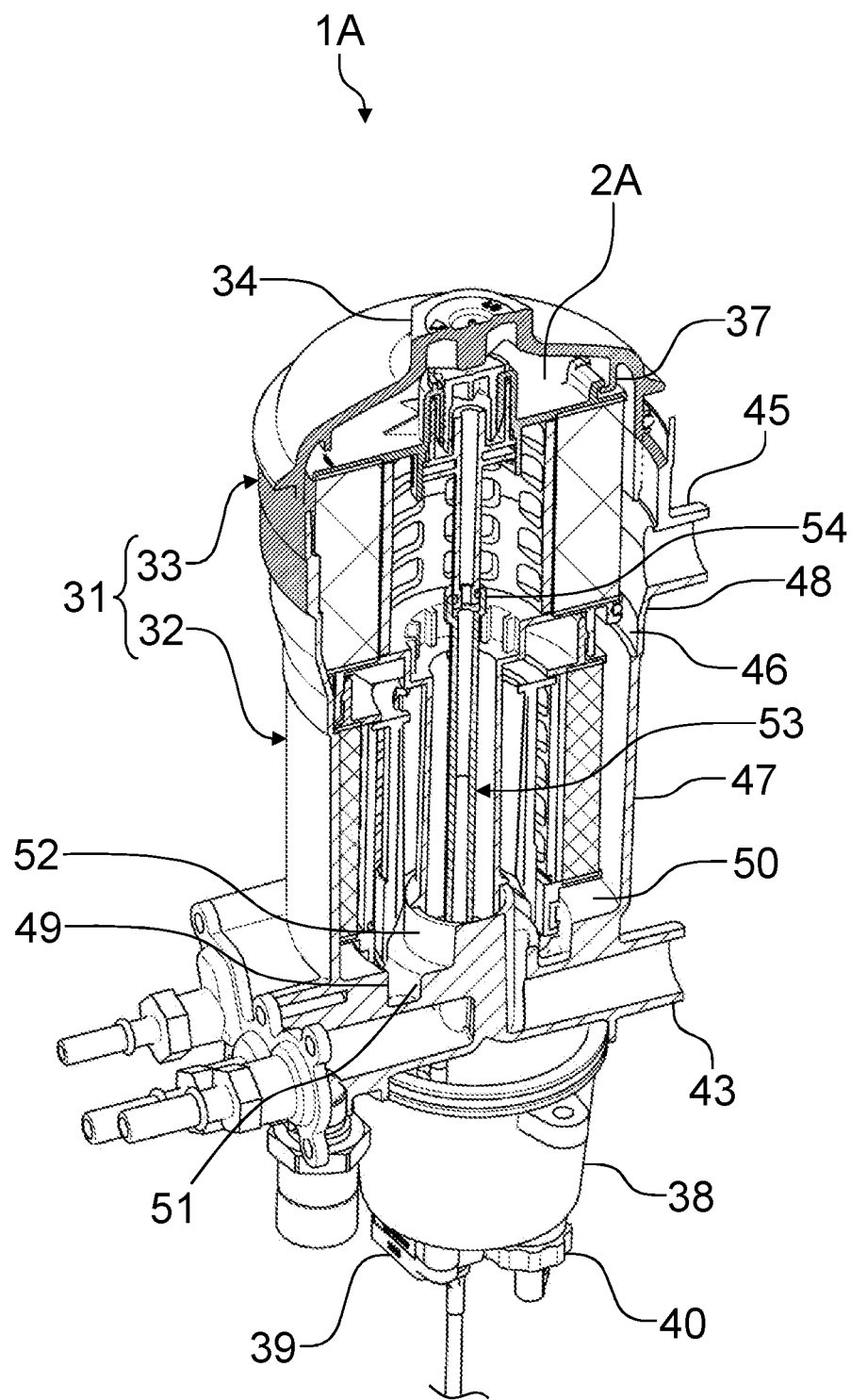
FIG. 1 shows a schematic section view of an embodiment of a filter assembly.
Figure 2:
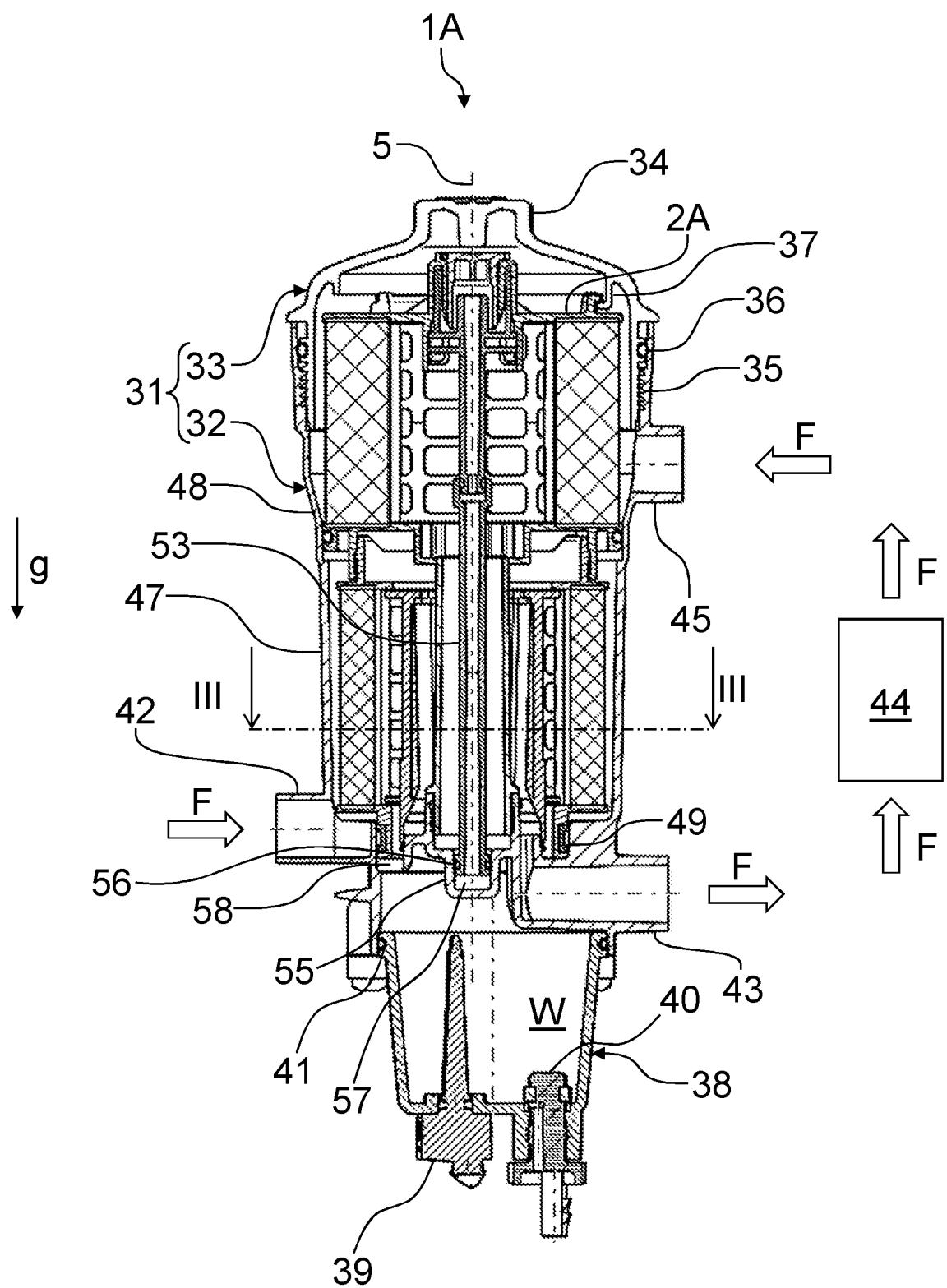
FIG. 2 shows a further schematic section view of the filter assembly according to FIG. 1.
Figure 3:
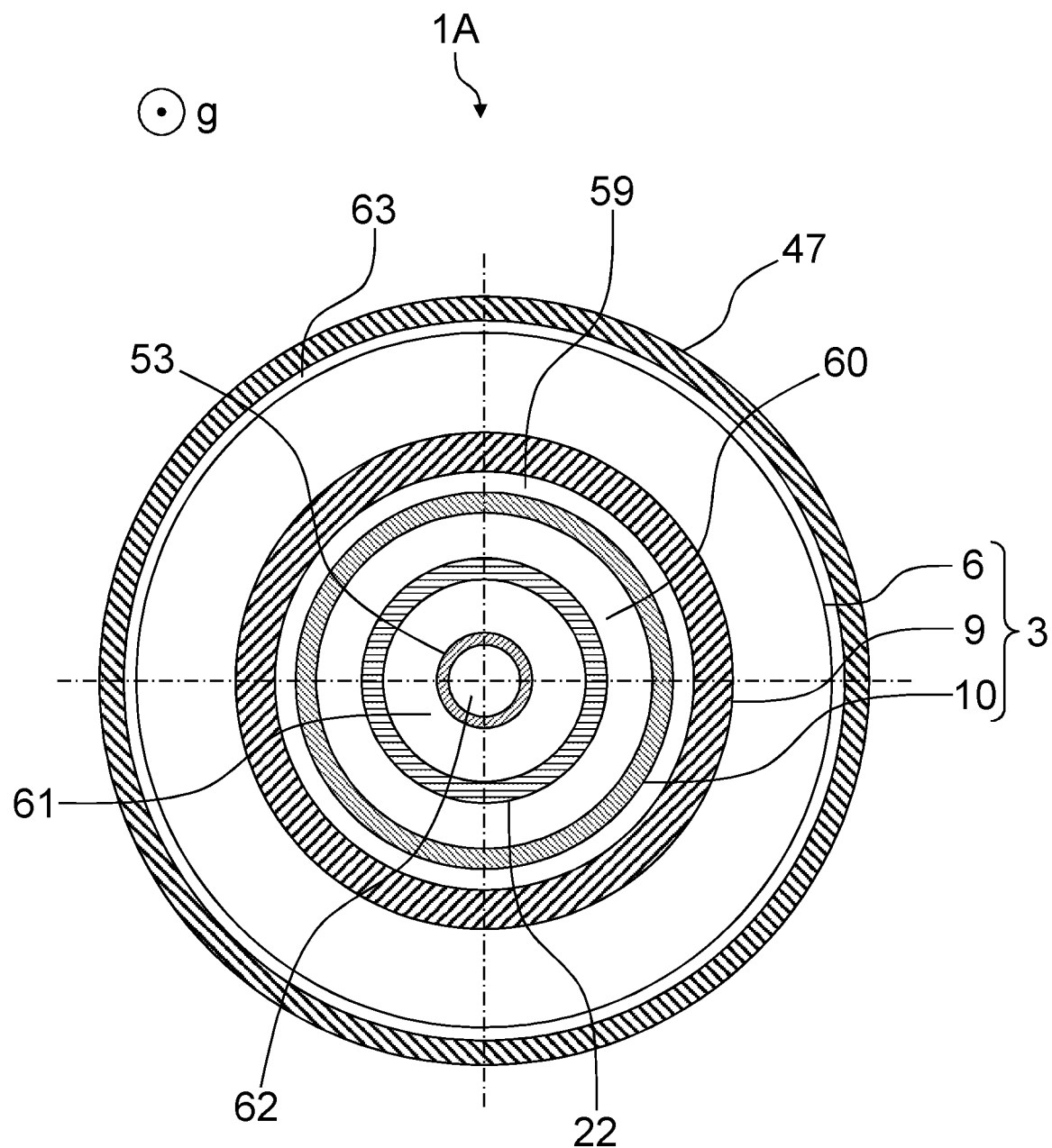
FIG. 3 shows a further schematic section view of the filter assembly according to the section line III-III of FIG. 2.

FIGS. 1 and 2 show respectively a schematic section view of an embodiment of a filter assembly 1A. FIG. 3 shows a further schematic section view of the filter assembly 1A according to the section line III-III of FIG. 2. The filter assembly 1A can be suitable for filtering liquid operating media of a vehicle, for example, oil or fuels, such as diesel fuel, kerosene or gasoline. In certain embodiments, the filter assembly 1A can also be suitable for filtering urea solutions. Particularly preferred, the filter assembly 1A is a fuel filter assembly.

Preferably, the filter assembly 1A is used in motor vehicles, in particular in passenger cars, trucks, construction vehicles or agricultural machines, in watercraft, in rail vehicles or in aircraft. In particular, the filter assembly 1A can be used in the field of commercial vehicles, particular preferred for so-called heavy-duty applications. Moreover, the filter assembly 1A can be used, for example, in the field of stationary energy generation. Particularly preferred, the filter assembly 1A is suitable for filtering diesel fuel.

Figure 4:
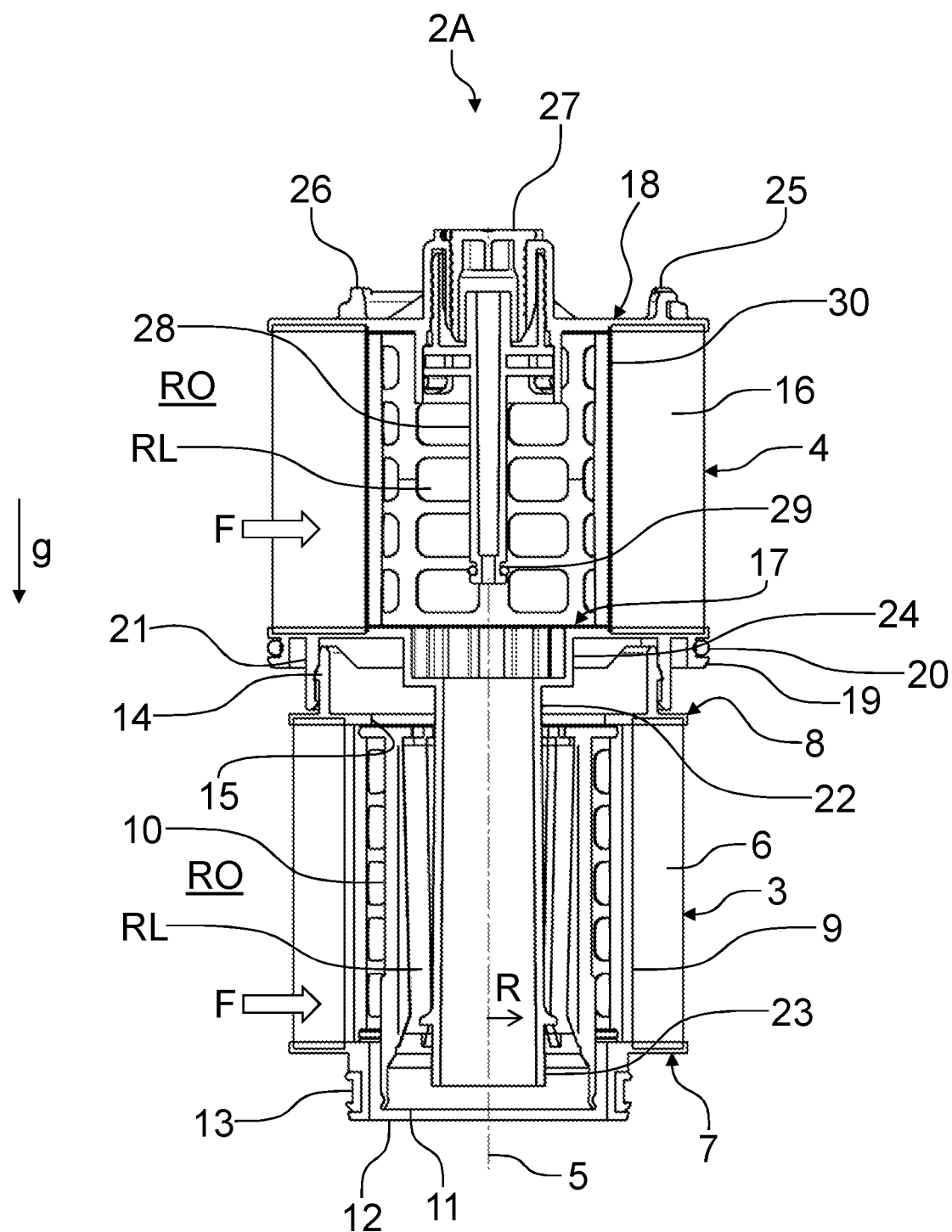
FIG. 4 shows a schematic section view of an embodiment of a filter module for the filter assembly according to FIG. 1.

The filter assembly 1A comprises a filter module 2A which is illustrated in FIG. 4 in a section view. The filter module 2A is preferably a fuel filter module for filtering diesel fuel of an internal combustion engine, in particular of a diesel engine. The filter module 2A comprises a prefilter element 3 and a main filter element 4. In the orientation of FIG. 4, the pre-filter element 3 and the main filter element 4 are arranged on top of each other. The filter module 2A can be referred to as a double deck filter.

The filter module 2A is embodied substantially of rotational symmetry in relation to the center or symmetry axis 5. Viewed along the symmetry axis 5 or in a direction of gravity g, the prefilter element 3 and the main filter element 4 are arranged adjacent or above each other. The filter module 2A has correlated therewith a radial direction R. The radial direction R is positioned perpendicularly to the symmetry axis 5 and points away from the latter.

The prefilter element 3 comprises a filter medium 6. The filter medium 6 can be a filter body of flat and zigzag-shaped folded filter material. The zigzag-shaped filter material of the filter medium 6 can be embodied thus as a star-shaped endless folded bellows whose envelope surface is substantially cylinder-shaped. The filter medium 6 can be or can comprise, for example, a woven filter material, a laid filter material or a filter nonwoven. The filter medium 6 can be filtered or needled. The filter medium 6 can comprise natural fibers, such as cellulose or cotton, or synthetic fibers, for example, of polyester, polyvinyl sulfide or polytetrafluoroethylene. Fibers of the filter medium 6 can be oriented during manufacture in the machining direction, at a slant thereto and/or transverse thereto.

The filter medium 6, viewed along the symmetry axis 5, is arranged between a first or bottom end disk 7 and a second or top end disk 8. The filter medium 6 can be glued, welded or fused to the end disks 7, 8. The filter medium 6 is supported inwardly by a fluid-permeable support pipe 9. The support pipe 9 can be of a tubular configuration. The support pipe 9 can also be embodied as a support structure or can be referred to as such.

Preferably, the support pipe 9 is grid-shaped. The support pipe 9 can prevent collapse of the filter medium 6. The support pipe 9 can be connected fixedly to the end disks 7, 8, for example, glued, fused or welded thereto.

The filter medium 6 comprises a raw side RO and a clean side RL. A fluid F to be purified, for example, diesel fuel, passes from the raw side RO through the filter medium 6 to the clean side RL, whereby the filter medium 6 filters out dirt particles, suspended matter and the like from the fluid F.

The prefilter element 3 comprises a water separation unit 10 for separating water contained in the fluid F. The water separation unit 10 comprises a coalescing medium for separating water from the fluid F. The water separation unit 10 is arranged in fluid communication downstream of the filter medium 6 of the prefilter element 3. This means that the fluid F passes from the raw side RO first through the filter medium 6 and then through the water separation unit 10 to the clean side RL. In this context, the water separation unit 10 separates water from the fluid F. The water separation unit 10 is cylinder-shaped and extends circumferentially about the symmetry axis 5. In the orientation of FIG. 4, the water separation unit 10 comprises a flange-shaped prefilter interface 11 that is arranged at the bottom side.

A cylinder-shaped water separation interface 12 projects at the bottom side from the first end disk 7 in which the prefilter interface 11 of the water separation unit 10 is received. The water separation interface 12 is a sealing flange or can be referred to as a sealing flange. The water separation interface 12 extends circumferentially about the prefilter interface 11. The water separation interface 12 comprises a sealing element 13 circumferentially extending about the symmetry axis 5. The sealing element 13 is elastically deformable. For example, the sealing element 13 is manufactured from an elastomer material, in particular from fluoroelastomer (FKM), fluorovinylmethylsiloxane rubber (FVMQ), acrylonitrile butadiene rubber (NBR) and/or hydrogenated acrylonitrile butadiene rubber (HNBR); possible are however also thermoplastic elastomers (TPE), for example, thermoplastic polyurethane (TPU).

A connecting section 14 projects at the top side from the second end disk 8. The connecting section 14 can be cylinder-shaped and extends circumferentially about the symmetry axis 5. The connecting section 14 can be embodied in the form of a snap hook or in the form of a plurality of snap hooks. The second end disk 8 comprises moreover a penetration 15. The penetration 15 can be circular.

The main filter element 4 comprises, as does the prefilter element 3, a filter medium 16. The filter medium 16, like the filter medium 6, can be folded in a zigzag shape and substantially have a cylinder-shaped geometry which is constructed with rotational symmetry in relation to the symmetry axis 5. The filter medium 16 comprises a raw side RO and a clean side RL. A fluid F to be filtered that has already been pre-filtered by the prefilter element 3 passes from the raw side RO through the filter medium 16 to the clean side RL.

The filter medium 16 is arranged between a bottom or first end disk 17 and a second or top end disk 18. For example, the filter medium 16 is glued, fused or welded to the end disks 17, 18. The first end disk 17 comprises a sealing flange 19 extending circumferentially about the symmetry axis 5 and provided with a sealing element 20 in the form of an O-ring. Moreover, the first end disk 17 comprises a connecting section 21, suitable to engage the connecting section 14 by form fit engagement. The connecting section 21 can be embodied in the form of one or a plurality of snap hooks. By means of the connecting sections 14, 21 the prefilter element 3 and the main filter element 4 can be connected to form the filter module 2A.

A standpipe 22 is integrally formed at the first end disk 17. The standpipe 22 passes through the penetration 15 of the second end disk 8 of the prefilter element 3 all the way through the prefilter element 3 to the water separation interface 12 of the prefilter element 3. The standpipe 22 can comprise a main filter interface 23 in the form of an outer thread. The standpipe 22 is connected by a pot section 24 as one piece, in particular monolithically, to the first end disk 17.

The second end disk 18 comprises engagement sections 25, 26 that are part of a bayonet closure. Moreover, a venting unit 27 for venting the filter module 2A is provided at the second end disk 18. A venting pipe or a tubular venting interface 28 with a sealing element 29 in the form of an O-ring is correlated with venting unit 27. The venting interface 28 extends, viewed along the symmetry axis 5, into the main filter element 4 in the direction toward the prefilter element 3. Between the first end disk 17 and the second end disk 18, a support pipe 30 is provided. The support pipe 30 can be connected fixedly to the end disks 17, 18. For example, the support pipe 30 is glued, fused or welded to the end disks 17, 18.

Returning now to FIGS. 1 to 3, the filter arrangement 18 comprises, in addition to the filter module 2A, a filter housing 31 in which the filter module 2A is received. The filter housing 31 comprises a filter pot 32 that accommodates the filter module 2A as well as a housing cover 33 designed to be removable from the filter pot 32. The filter pot 32 and the housing cover 33 can be, for example, plastic components, in particular injection molded plastic components.

The housing cover 33 comprises an engagement section 34 that can be engaged, for example, by a tool in order to separate the housing cover 33 from the filter pot 32. A connection between the filter pot 32 and the housing cover 33 can be designed as a screw connection 35. In this context, the housing cover 33 is fluid-tightly sealed relative to the filter pot 32 by means of a sealing element 36, for example, an O-ring.

At the inner side, meaning facing away from the engagement section 34, counter engagement sections 37 are provided that are suitable to engage with form fit the engagement sections 25, 26 of the filter module 2A. In this way, the filter module 2A can be coupled to the housing cover 33 in such a way that, when separating the housing cover 33 from the filter pot 32, the filter module 2A together with the housing cover 33 can be pulled off the filter pot 32.

In the orientation of FIGS. 1 and 2, a water collecting chamber 38 is provided at the bottom side at the filter pot 32 for collecting water W that has been separated from the fluid F by means of the water separation unit 10. A filling level sensor 39 is provided at the water collecting chamber 38 by means of which the filling level of the water collecting chamber 38 can be detected and output. Moreover, the water collecting chamber 38 can comprise a drain valve 40 for draining the water W. The water collecting chamber 38 can be screwed, for example, to the filter pot 32 or can be detachably connected thereto in other ways. The water collecting chamber 38 can be sealed by means of a sealing element 41, in particular an O-ring, relative to the filter pot 32.

The filter pot 32 comprises an inlet 42 correlated with the prefilter element 3 by means of which the fluid F to be purified is supplied to the raw side RO of the prefilter element 3. Moreover, the filter pot 32 comprises an outlet 43 correlated with the prefilter element 3 which is in fluid communication with the clean side RL of the prefilter element 3. By means of the outlet 43, the pre-purified fluid F that has been pre-purified by the prefilter element 3 is supplied to a fuel pump 44. The fuel pump 44 supplies the pre-purified fluid F by means of an inlet 45 correlated with the main filter element 4 to the raw side RO of the main filter element 4.

The filter pot 32 comprises at the inner side a sealing surface 46 at which the sealing element 20 of the main filter element 4 is resting fluid-tightly so that the first end disk 17 of the main filter element 4 fluid-tightly seals against the sealing surface 46. The filter pot 32 comprises moreover a receiving section 47 for receiving the prefilter element 3 as well as a receiving section 48 for receiving the main filter element 4. The sealing surface 46, viewed along the symmetry axis 5, is arranged between the receiving sections 47, 48.

The filter pot 32 comprises a circumferentially extending cylinder-shaped sealing surface 49 at which the sealing element 13 of the prefilter element 3 is resting seal-tightly. A bottom 50 of the receiving section 47 is provided perpendicularly to the sealing surface 49. The first end disk 7 of the prefilter element 3 can rest against the bottom 50. A further cylinder-shaped sealing surface 51 is provided coaxially to the sealing surface 49, and the prefilter interface 11 of the water separation unit 10 is seal-tightly resting fluid-tightly against it.

Moreover, coaxially to the sealing surfaces 49, 51, a receiving section 52 is provided in which the standpipe 22 of the main filter element 4 is received with its main filter interface 23. Between the standpipe 22 and the receiving section 52, a sealing element, for example, in the form of an O-ring, can be provided. The receiving section 52 extends, viewed along the symmetry axis 5, past the bottom 50.

In the filter pot 32, a venting pipe 53 is provided that is detachably connected to the venting interface 28 of the main filter element 4. For this purpose, the venting interface 28 and the venting pipe 53 can be inserted into each other. The venting pipe 53 comprises for this purpose a connecting section 54 in which an end section of the venting interface 28 comprising the sealing element 29 is received. The venting pipe 53 is received in a receiving section 55 which is concentrically arranged to the sealing surfaces 49, 51. At the end face, the venting pipe 53 can comprise a sealing element 56, for example, in the form of an O-ring, which fluid-tightly seals the venting pipe 53 relative to the receiving section 55. The filter module 2A can be vented by means of the venting outlet 57 provided at the receiving section 55.

The functionality of the filter assembly 1A will be explained in the following. In operation of the filter assembly 1A, the unfiltered fluid F which has been sucked in by the fuel pump 44 flows through the inlet 42 into the receiving section 47 of the filter pot 32. The unfiltered fluid F is now located at the raw side RO of the prefilter element 3. The fluid F flows through the filter medium 6 in radial direction from the exterior to the interior in the direction toward the symmetry axis 5.

The water W that is contained in the fluid F is separated by means of the water separation unit 10 from the fluid F and flows, following the direction of gravity g, between the support pipe 9 and the water separation unit 10 through a water drainage channel 58 provided in the filter pot 32 downwardly into the water collecting chamber 38. For this purpose, between the support pipe 9 and the water separation unit 10 a water drainage gap 59 (FIG. 3) is provided which is in fluid communication with the water drainage channel 58.

The fluid F, from which water W has been removed at least partially, passes through the water separation unit 10 and flows into a fluid drainage gap 60 (FIG. 3) provided between the water separation unit 10 and the standpipe 22 along the direction of gravity g in downward direction to the outlet 43. The fuel pump 44 conveys the pre-purified fluid F from the outlet 43 to the inlet 45.

The pre-purified fluid F passes through the filter medium 16 of the main filter element 4 and flows along the direction of gravity g in downward direction. In this context, a fluid drainage gap 61 (FIG. 3) between the standpipe 22 and the venting interface 28 or the venting pipe 53 is provided. From the fluid drainage gap 61, the purified fluid F flows through an outlet, not shown, of the filter pot 32 to an internal combustion engine, not shown. Venting of the filter module 2A or of the receiving sections 47, 48 is realized by means of the venting unit 27. Venting is realized in this context by a venting gap 62 which is surrounded by the venting interface 28 and the venting pipe 53. Between the receiving section 47 of the filter pot 32 and the prefilter element 3, a raw fluid gap 63 is provided in which still unfiltered fluid F is located.

For exchange of the filter module 2A, the housing cover 33 is removed from the filter pot 32 in a first step. The bayonet closure which is formed by the engagement sections 25, 26 and the counter engagement sections 37 between the housing cover 33 and the second end disk 18 of the main filter element 4 is closed or will be closed by the screwing movement of the housing cover 33. The filter module 2A is moved by the screwing movement of the housing cover 33 as a whole axially along the symmetry axis 5 out of its installation position illustrated in FIGS. 1 and 2. The screwing movement also causes release of the standpipe 22 from the receiving section 52 at the same time.

As soon as the sealing element 20 of the main filter element 4 no longer contacts the sealing surface 46 of the filter pot 32, the pre-filtered fluid F flows out of the receiving section 48 into the receiving section 47. Since the receiving section 52 extends past the bottom 50, it is reliably prevented that contaminated fluid reaches the outlet, not shown, of the filter pot 32.

Figure 5:
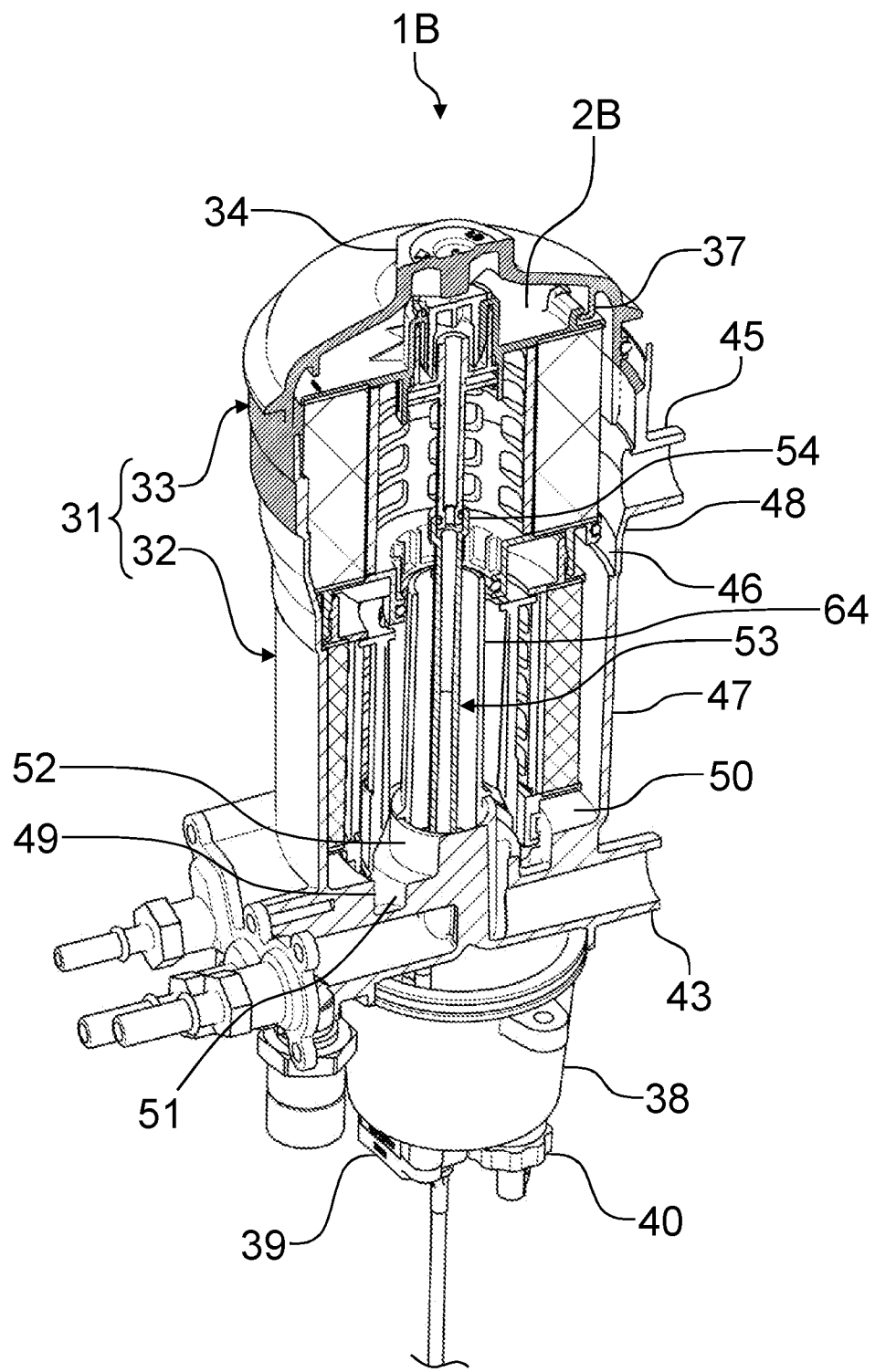
FIG. 5 shows a schematic section view of a further embodiment of a filter assembly.
Figure 6:
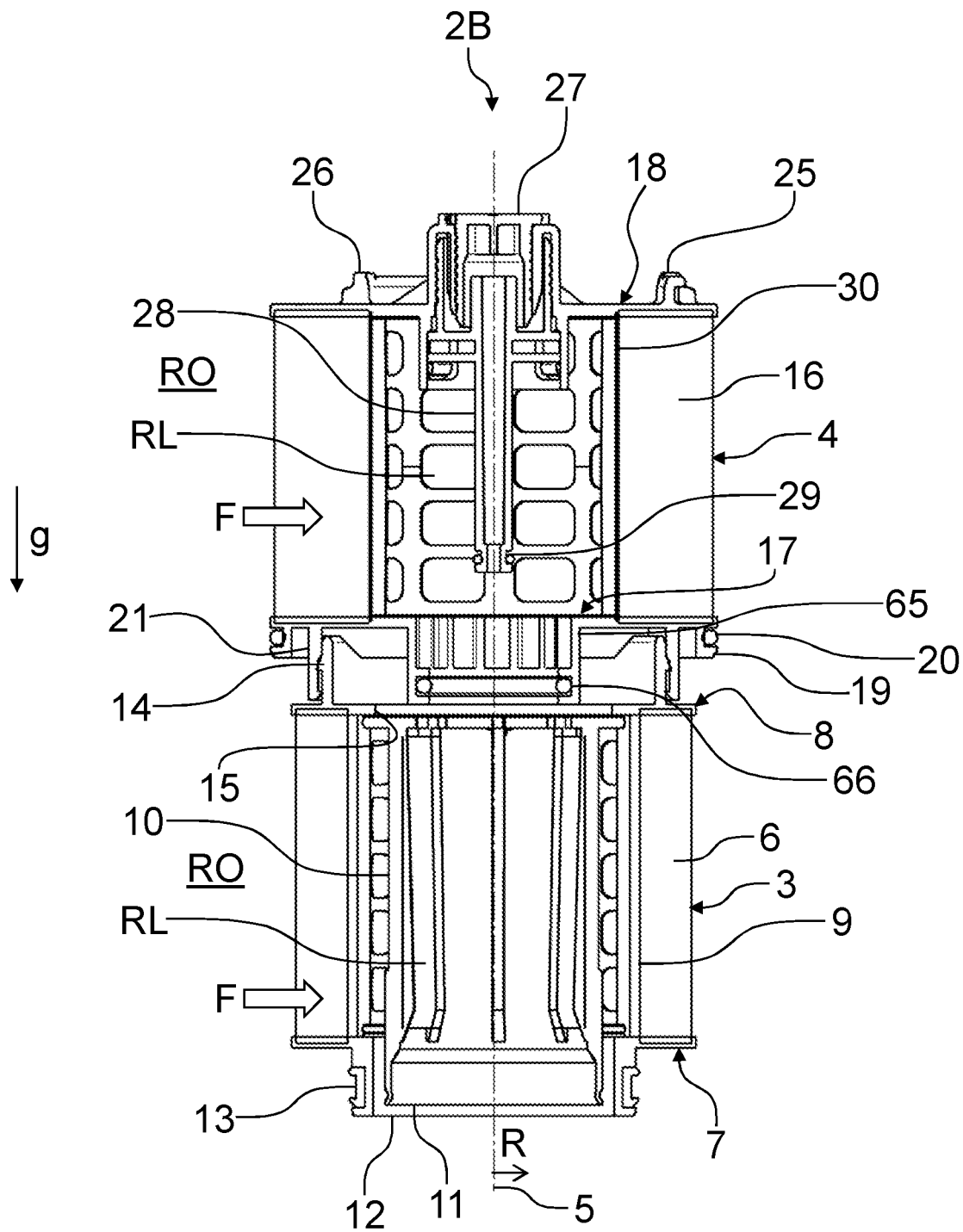
FIG. 6 shows a schematic section view of an embodiment of a filter module for the filter assembly according to FIG. 5.

FIG. 5 shows a schematic section view of a further embodiment of a filter assembly 1B. FIG. 6 shows a schematic section view of an embodiment of a filter module 2B for the filter assembly 1B.

The filter module 2B according to FIG. 6 differs from the filter module 2A according to FIG. 4 only in that the first end disk 17 of the main filter element 4 does not comprise a standpipe 22 but that a standpipe 64 (FIG. 5) is provided in the form of a separate component. The standpipe 64 is inserted into a pot-shaped main filter interface 65 of the first end disk 17 of the main filter element 4. In this context, at the main filter interface 65 a sealing element 66 in the form of an O-ring is provided. In this embodiment of the filter arrangement 1B, the standpipe 64 can remain in the filter pot 32 upon exchange of the filter module 2B.

REFERENCE CHARACTERS USED 1A filter assembly
1B filter assembly
2A filter module
2B filter module
3 primary filter element/prefilter element
4 secondary filter element/main filter element
5 symmetry axis
6 filter medium
7 end disk
8 end disk
9 support pipe
10 water separation unit
11 prefilter interface
12 water separation interface
13 sealing element
14 connecting section
15 penetration
16 filter medium
17 end disk
18 end disk
19 sealing flange
20 sealing element
21 connecting section
22 standpipe
23 main filter interface
24 pot section
25 engagement section
26 engagement section
27 venting unit
28 venting interface
29 sealing element
30 support pipe
31 filter housing
32 filter pot
33 housing cover
34 engagement section
35 screw connection
36 sealing element
37 counter engagement section
38 water collecting chamber
39 filling level sensor
40 drain valve
41 sealing element
42 inlet
43 outlet
44 fuel pump
45 inlet
46 sealing surface
47 receiving section
48 receiving section
49 sealing surface
50 bottom
51 sealing surface
52 receiving section
53 venting pipe
54 connecting section
55 receiving section
56 sealing element
57 venting outlet
58 water drainage channel
59 water drainage gap
60 fluid drainage gap
61 fluid drainage gap
62 venting gap
63 raw fluid gap
64 standpipe
65 main filter interface
66 sealing element
F fluid
g direction of gravity
R radial direction
RL clean side
RO raw side
W water

What is claimed is:

1. A filter module for a filter assembly, the filter module comprising:
a primary filter element, comprising:
an annular primary filter medium surrounding a central axis, the central axis defining an axial direction;
an annular water separation unit comprising a coalescing filter medium arranged in an interior of the primary filter element, a lower axial end of the annular water separation unit forming a primary filter interface;
a bottom end disk arranged on an axial bottom end face of the annular primary filter medium, the bottom end disk having a water separation interface formed as a tubular axial projection projecting outwardly on an axially bottom side of the bottom end disk, an interior of the water separation interface in fluid communication with an interior of the annular primary filter medium;
wherein the water separation interface is configured to discharge water, the water having been separated by the primary filter element from a fluid (F) to be filtered from the primary filter element;
a secondary filter element arranged above the primary filter element relative to a direction of gravity, the secondary filter element comprising:
an annular secondary filter medium surrounding the central axis;

an end disk arranged between and connected directly or indirectly to a bottom end face of the annular secondary filter medium and an upper end face of the annular primary filter medium;

a tubular stand pipe arranged on the end disk and projecting axially downwardly away from the end disk into an interior of the annular primary filter medium, an interior of the tubular stand pipe in fluid communication with an interior of the annular secondary filter medium;

wherein an axial bottom end of the tubular stand pipe forms a secondary filter interface discharging filtered fluid from the interior of the annular secondary filter medium;

wherein the tubular stand pipe extends through the interior of the annular primary filter medium to a lower axial end forming a secondary filter interface radially within an interior of the water separation interface;

wherein the water separation interface, the primary filter interface, and the secondary filter interface are each configured to provide an axial outflow of material flows in the axial direction of the central axis of the filter module;

wherein the secondary filter interface is radially surrounded by the primary filter interface which is radially surrounded by the water separation interface in a region of the bottom end disk of the primary filter element; wherein the primary filter element is a prefilter element and is arranged fluidically upstream of the secondary filter element and configured such that the fluid (F) flows in sequence first through the primary filter element and then the secondary filter element; wherein the primary filter interface is a prefilter interface, wherein the secondary filter element is a main filter element, and the secondary filter interface is a main filter interface.

2. The filter module according to claim 1, wherein the water separation interface, the primary filter interface, and the secondary filter interface are concentrically arranged relative to each other.

3. The filter module according to claim 1, wherein the water separation interface, the primary filter interface, and the secondary filter interface, viewed along the symmetry axis of the filter module, are positioned axially displaced relative to each other.

4. The filter module according to claim 1, further comprising
a venting interface arranged coaxially in relation to the symmetry axis.

5. The filter module according to claim 4, wherein, in relation to a radial direction of the filter module, the venting interface is arranged radially inside the secondary filter interface.

6. The filter module according to claim 4, wherein the venting interface is recessed in the axial direction in relation to the water separation interface, the primary filter interface, and the secondary filter interface.

7. The filter module according to claim 4, wherein the venting interface is recessed in the axial direction and concentrically arranged in relation to the water separation interface, the primary filter interface, and the secondary filter interface.

8. The filter module according to claim 4, wherein the venting interface is concentrically arranged in relation to the water separation interface, the primary filter interface, and the secondary filter interface.

9. The filter module according to claim 1, wherein the secondary filter interface extends at least in sections through the primary filter element.

10. The filter module according to claim 1, wherein the primary filter element and the secondary filter element are connected with form fit to each other to form the filter module.

11. The filter module according to claim 1, wherein the primary filter element and the secondary filter element are welded or fused to each other.

12. The filter module according to claim 1, wherein the annular filter medium is folded in a star shape.

13. The filter module according to claim 1, wherein the primary filter element and/or the secondary filter element comprise a hollow cylindrical construction.

14. A filter assembly comprising:
a filter housing;
a filter module according to claim 1 exchangeably received in the filter housing.

15. A filter assembly according to claim 14, wherein the filter assembly is a fuel filter assembly.

* * * * *